United States Patent [19]
McCarthy et al.

[11] Patent Number: 5,967,584
[45] Date of Patent: Oct. 19, 1999

[54] EXPANDABLE TRUNK STORAGE SYSTEM

[75] Inventors: David J. McCarthy; Russell P. Shafer; Jonathan A. Dykstra; Donald L. Sauer; Chester R. Wisniewski, all of Holland; Christopher R. Fusco, Grand Rapids; Rick A. Anderson, Grand Haven; Mark E. Adomeit, Holland, all of Mich.

[73] Assignee: Prince Corporation, Holland, Mich.

[21] Appl. No.: 08/918,902

[22] Filed: Aug. 27, 1997

[51] Int. Cl.$^6$ .................................................. B60R 5/04
[52] U.S. Cl. .......................................... 296/37.16; 296/69
[58] Field of Search ........................ 296/26.08, 26.07, 296/37.16, 65.01, 65.12, 69, 37.1, 37.8, 65.16, 66

[56] References Cited

U.S. PATENT DOCUMENTS

| | | |
|---|---|---|
| 1,426,129 | 8/1922 | Velo . |
| 1,769,343 | 7/1930 | Henry . |
| 2,140,968 | 12/1938 | Paranzino . |
| 2,465,770 | 3/1949 | Volsk . |
| 2,525,952 | 10/1950 | Saterlie et al. . |
| 3,336,071 | 8/1967 | Neale et al. . |
| 4,198,091 | 4/1980 | Appleton ............................ 296/69 X |
| 4,270,790 | 6/1981 | Curotto ............................ 296/37.16 |
| 4,286,819 | 9/1981 | Inoue et al. . |
| 4,475,763 | 10/1984 | Hamatani et al. . |
| 4,708,385 | 11/1987 | Kondo . |
| 4,733,901 | 3/1988 | Okuyama . |
| 5,273,336 | 12/1993 | Schubring et al. . |
| 5,628,543 | 5/1997 | Filipovich et al. ............... 296/37.1 X |

FOREIGN PATENT DOCUMENTS

| | | | |
|---|---|---|---|
| 3419758 | 11/1985 | Germany ........................ 296/37.1 |
| 3602298 | 7/1987 | Germany ....................... 296/37.16 |
| 58-116428 | 8/1983 | Japan . |
| 59-15715 | of 1984 | Japan . |
| 60-199743 | 10/1985 | Japan . |
| 61-193949 | 8/1986 | Japan . |
| 4230436 | 8/1992 | Japan . |
| 61-71430 | 6/1994 | Japan . |
| 75124 | 8/1932 | Sweden . |

*Primary Examiner*—D. Glenn Dayoan
*Assistant Examiner*—Jason Morrow
*Attorney, Agent, or Firm*—Price, Heneveld, Cooper, DeWitt & Litton

[57] ABSTRACT

A storage system includes an elongated, generally rectangular housing which has a forward-facing surface in the vehicle defining the rear seat backs of a vehicle and which has an open opposite end for extending into the trunk of a vehicle. The housing is slidably mounted to move from a retracted position substantially within the vehicle trunk in which the forward-facing surface defines the rear seat back rests of the rear passenger area of a vehicle and an extended position in which the generally rectangular housing is moved forwardly to expand the available storage space within the trunk. In a preferred embodiment of the invention, the generally rectangular storage housing includes at least one pivoted access door such that access can be obtained to the rectangular storage housing from within the rear seat passenger area of the vehicle. In a preferred embodiment of the invention, the access means includes a pivoted top lid. In another preferred embodiment of the invention, the storage system further includes a pivoted forward-facing door to provide direct access to the trunk regardless of the position of the storage housing.

22 Claims, 3 Drawing Sheets

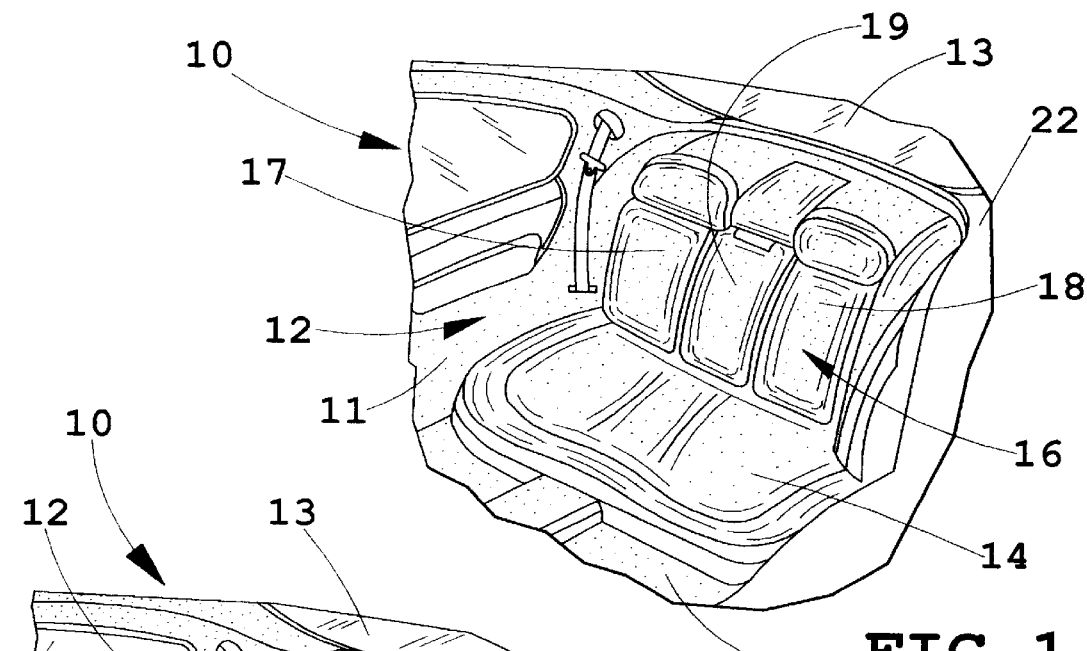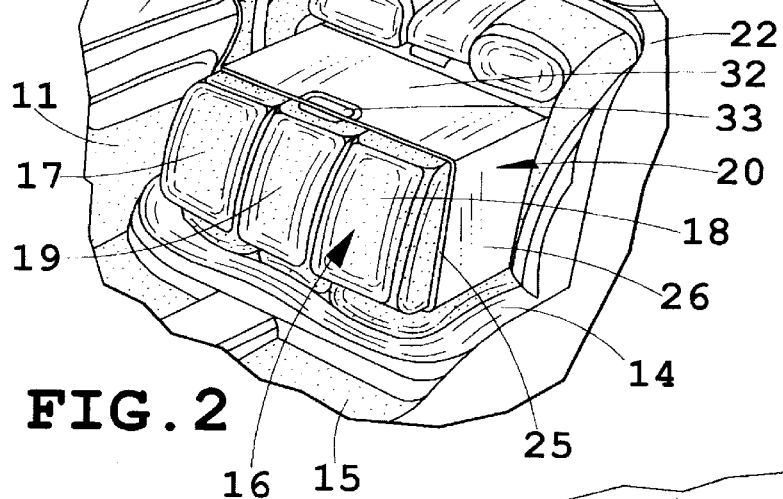

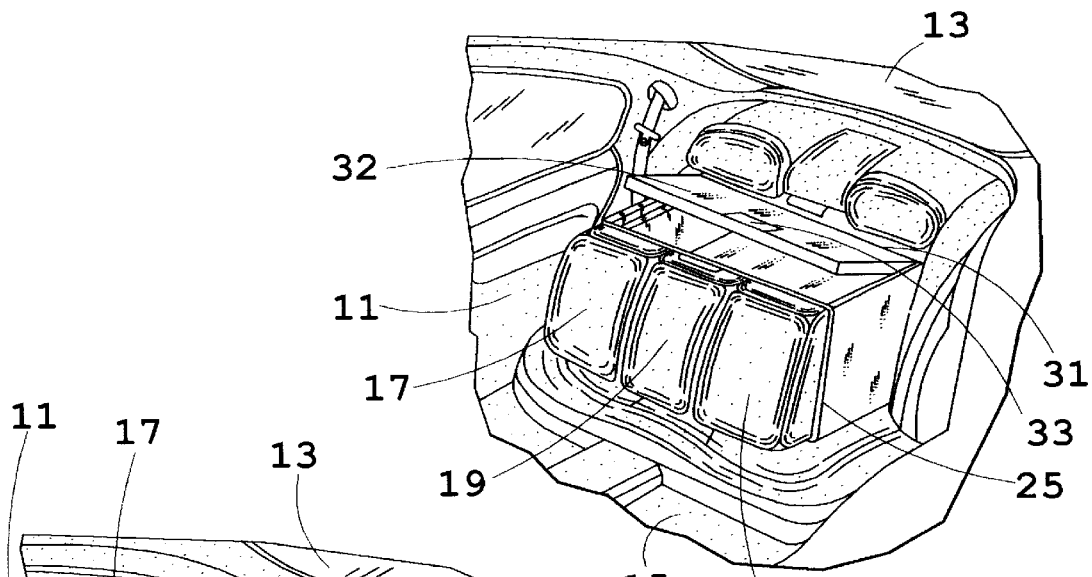
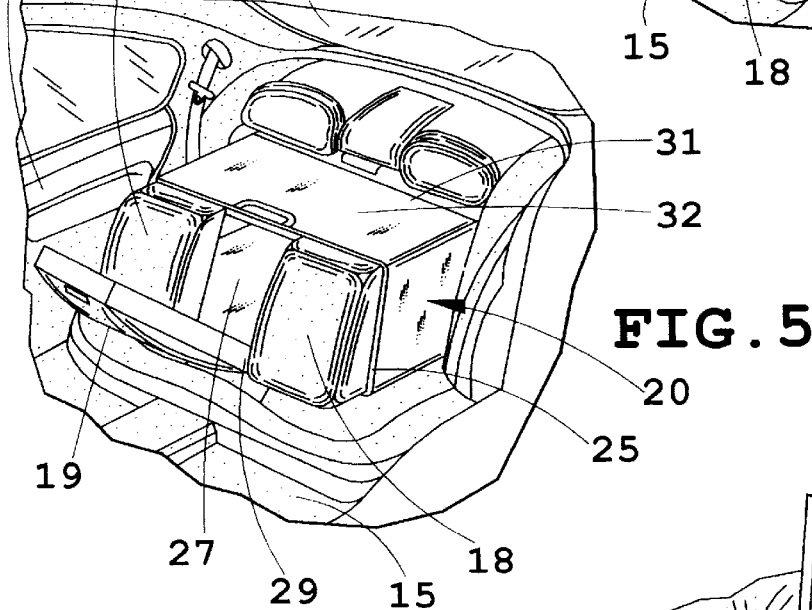
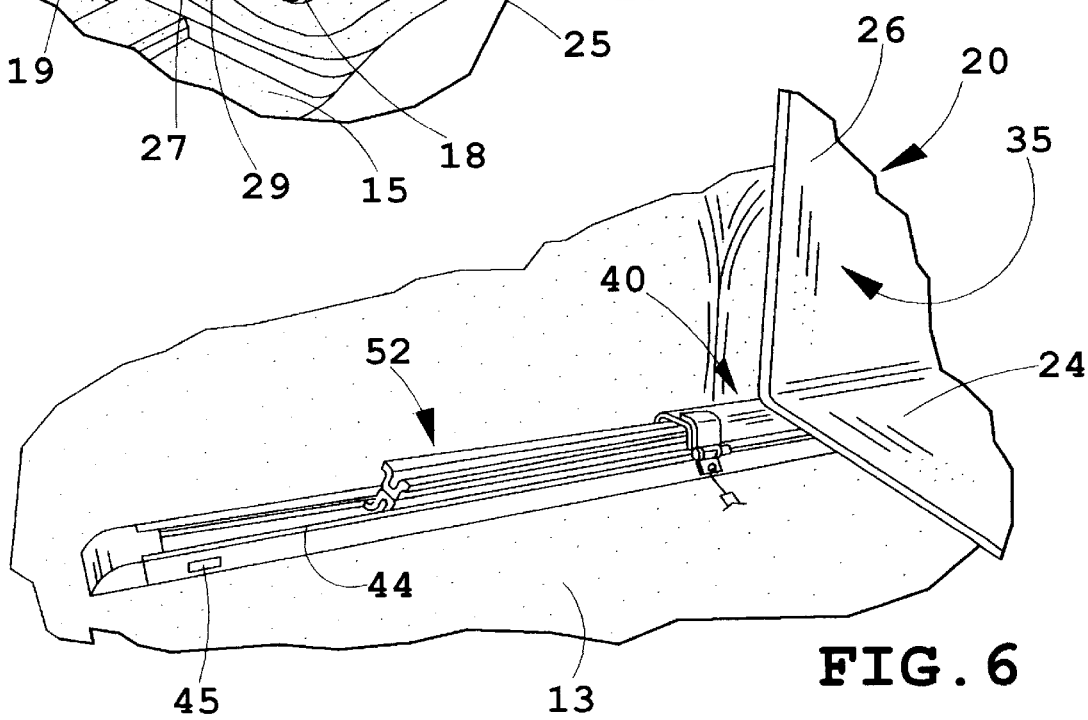

EXPANDABLE TRUNK STORAGE SYSTEM

BACKGROUND OF THE INVENTION

The present invention relates to a storage system for a vehicle, such as an automobile, and particularly one which provides an expanded trunk storage area.

There exists a variety of vehicle storage systems in which the rear seat backs of a vehicle can be pivoted to allow trunk access for storage of large items. Recently, for example, commercial vehicles have included a center rear armrest which can be opened to provide a storage bag extending into the rear passenger area through the trunk for the storage of elongated items such as skis. U.S. Pat. No. 2,140,968 discloses a system in which the rear seats and back of a vehicle can be moved to extend the trunk storage area into the rear seat area. Although providing the desired expansion of the trunk storage area into the rear seat passenger area, the items to be stored in the expanded trunk space are readily visible and contact the seating surfaces of the rear seat area. It is desired, therefore, to provide a storage system which expands the trunk storage area and provides a secure and attractive expanded storage area, and one which is accessible not only from the trunk but also from the rear passenger seat area of the vehicle.

SUMMARY OF THE PRESENT INVENTION

The system of the present invention provides these desired features by providing an elongated, generally rectangular housing which has a forward-facing surface in the vehicle defining in one embodiment the rear seat back support of a vehicle and which has an open opposite end extending in communication with the trunk. The housing is slidably mounted on elongated tracks to move from a retracted position within the vehicle trunk in which the forward-facing surface defines the rear seat back rests of the rear passenger area of a vehicle and an extended position in which the generally rectangular housing is moved forwardly to expand the available storage space within the trunk. In a preferred embodiment of the invention, the generally rectangular storage housing includes at least one pivoted access door such that access can be obtained to the rectangular storage housing from within the rear seat passenger area of the vehicle. In a preferred embodiment of the invention, the access means includes a pivoted top lid. In another preferred embodiment of the invention, the storage system further includes a pivoted forward-facing door to provide direct access to the trunk regardless of the position of the storage housing.

With such a system, therefore, the trunk space can be expanded to define an enclosed storage area which extends into the rear passenger area and which is accessible from both the trunk and rear passenger area of a vehicle. These and other features, objects and advantages of the present invention will best be understood by reference to the following description thereof together with the accompanying drawings.

BRIEF DESCRIPTION OF THE DRAWINGS

FIG. 1 is a fragmentary perspective view of the rear passenger seat area of a vehicle, such as an automobile, embodying the storage system of the present invention shown in a retracted position;

FIG. 2 is a fragmentary perspective view of the structure shown in FIG. 1, showing the storage system in an extended position;

FIG. 3 is an enlarged fragmentary, rear perspective view of the storage system shown in FIGS. 1 and 2, shown from the trunk area of the vehicle;

FIG. 4 is a fragmentary perspective view of the structure shown in FIGS. 1 and 2 shown with the access door in a partially open position for top access to the storage system from the rear passenger seat area;

FIG. 5 is a fragmentary perspective view of the structure shown in FIGS. 1–4 showing the front access door in a partially open position for access to the storage system through the rear passenger seat area;

FIG. 6 is an enlarged fragmentary perspective view of one of the slides for the storage system shown in FIGS. 1–5;

DETAILED DESCRIPTION OF THE PREFERRED EMBODIMENT

Figure 7:
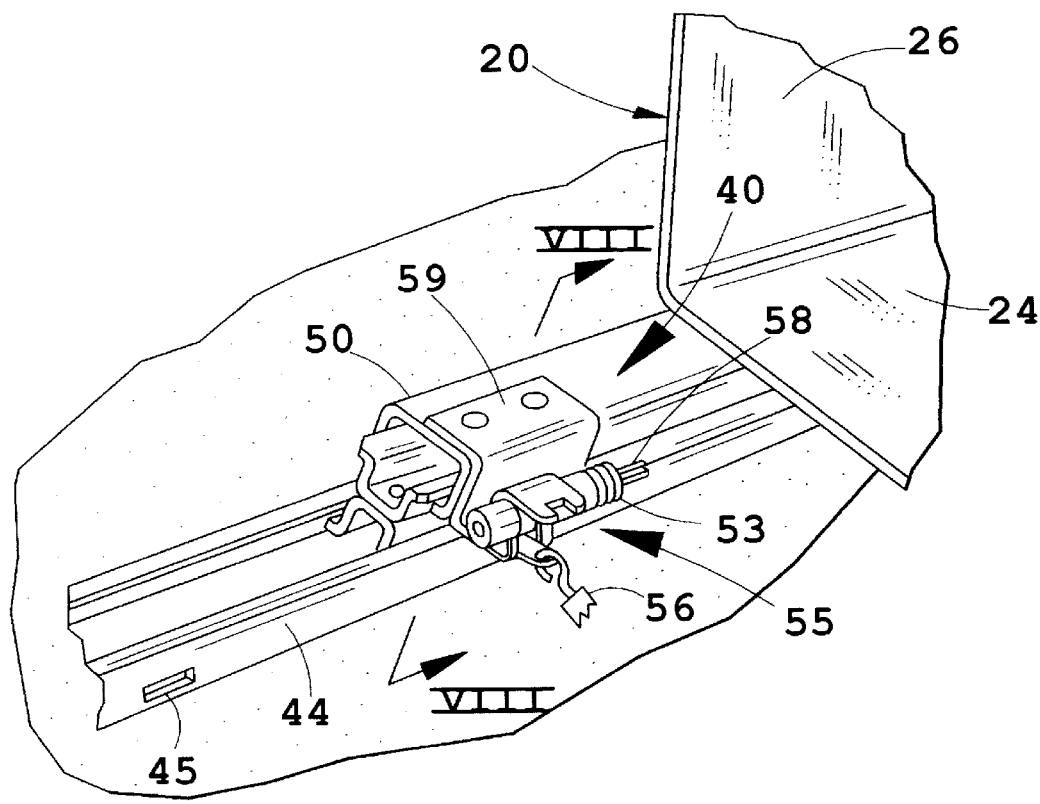
FIG. 7 is a greatly enlarged fragmentary perspective view of a latch for the slide used in connection with the storage system of the present invention.

Referring initially to FIGS. 1 and 2, there is shown a vehicle 10, such as an automobile, which includes a rear seat area 12 typically accessible from either side in four-door vehicles through side doors 11 or in two-door vehicles by moving the front seat backs. The rear seat area includes a horizontally extending seating surface 14 which can be conventional and which is fixedly mounted to the vehicle floor 15. According to the invention, however, the vertically extending back supports 16 of the rear seats are mounted to the expanded trunk storage housing 20 of the present invention. Thus, the vertically extending rear seat back supports include, as shown in FIGS. 1 and 2, a right-side passenger support 17, a left-side rear passenger support 18, and a center vertically extending support 19, all being upholstered and padded in a conventional manner to provide support for up to three persons sitting in the rear seating area 12 of vehicle 10. As will be described in greater detail hereinafter, the center support 19 forms a pivot-down access door for direct access to the trunk area 22 (FIG. 3) of a vehicle which is located behind the rear seat support area 16. A rear window 13 extends above the trunk area to the roof of the vehicle in a conventional manner.

The storage system of the present invention comprises a generally rectangular housing 20 which, as best seen in FIGS. 2-5, includes a floor 24, a left sidewall 26, a right sidewall 28 and a top 30 which integrally includes a pivot-open access door 32 (FIGS. 2 and 4) which is hingedly mounted to the top wall 30 utilizing a piano hinge 31 (FIGS. 4 and 5) or other suitable hinge construction. The padded upholstered seat backs 17, 18 and 19 are mounted to a front wall 25 (FIGS. 2, 4 and 5) of the generally rectangular storage housing 20 with front wall 25 having an opening 27 (FIG. 5) in the center thereof for permitting access to the open storage space 35 (FIG. 3) of the rectangular storage housing 20 which faces rearwardly within the trunk area 22 of the vehicle. For such purpose, the center back support 19 is pivotally mounted by hinge means 29 (FIG. 5) at its lower end to allow the center support 19 to pivot downwardly as shown in FIG. 5 for access through opening 27 to the trunk area 22 and storage area 35 of housing 20. The housing 20 can be integrally molded of a suitable polymeric material with sufficient rigidity to provide support for the back rests 17–19 and/or be made of a fiberglass reinforced resin to provide sufficient strength and rigidity to provide support for the backs of rear seat passengers as well as articles positioned within the storage housing 20 which, as now described, retracts from a stored position, as shown in FIG. 1, to an extended use position, as shown in FIGS. 2–5.

Figure 8:
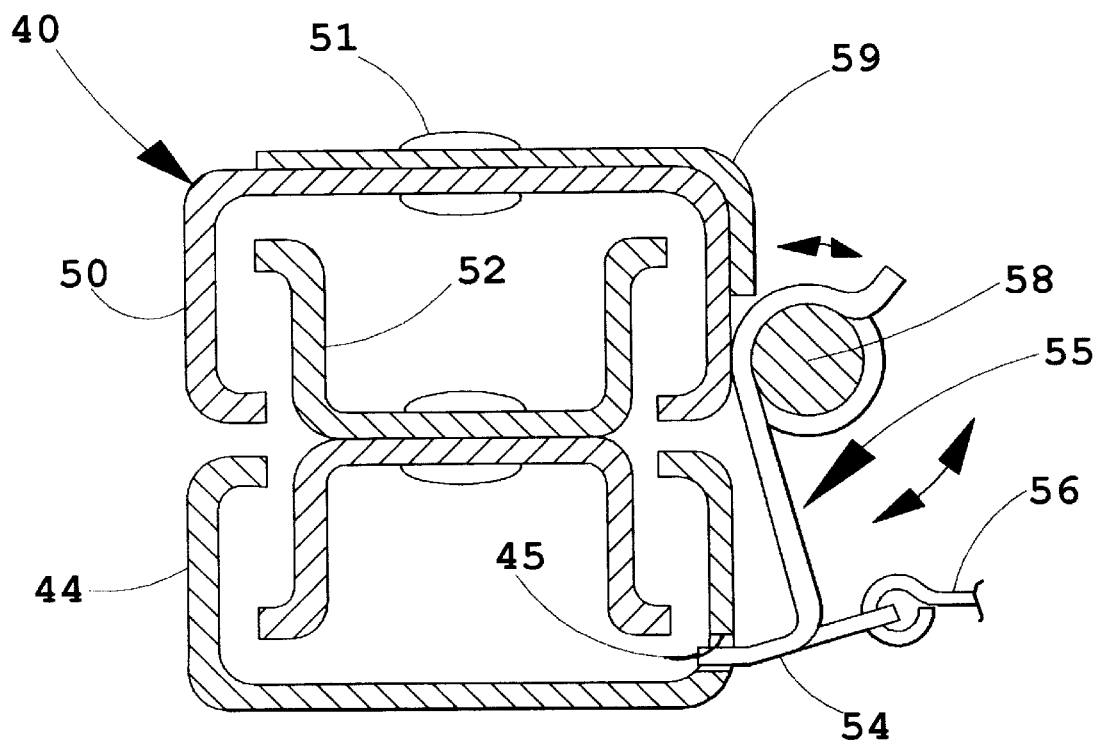
FIG. 8 is a greatly enlarged cross-sectional view of the structure shown in FIG. 7 taken along section lines VIII—VIII of FIG. 7.

Housing 20 includes a pair of elongated parallel-spaced rails 40 and 42 (FIGS. 6 and 3, respectively) mounted to the outer corners of the housing 20 and which slidably and mateably engage rails 44 and 46, respectively, to provide a sliding interface between housing 20 and the floor 13 of the vehicle trunk area 22. The slide mechanism can be of generally conventional construction and may include an upper, generally C-shaped channel 50 slidably engaging an H-shaped center slide member 52 which, in turn, engages the lower channel members 44 and 46, respectively, as best seen in FIG. 8. The use of the intermediate slide member 52 allows the relatively compact housing to extend and retract through a greater distance. Each of the lower members 44, 46 include locking slots 45 located to align in the fully retracted and fully extended positions with a pivoted latch assembly 55 (FIGS. 7 and 8). Latch assembly 55, thus, locks the storage housing 20 in either the position shown in FIG. 1 or that shown in FIGS. 2–5. For such purpose, the latch assembly 55 includes a generally L-shaped arm pivotally surrounding pivot pin 58 mounted to each slide 40, 42 by a bracket 59. The end 54 of the latch arm extends into slots 45 and is biased in the locking position shown in FIG. 8 by means of a surrounding coil spring 53 (FIG. 7). A release cable 56 is coupled to the arm 54 on each side of the slides and extends to a release handle 60 (FIG. 3) which is readily accessible by the vehicle operator to release the slidable housing 20 for movement between the retracted stored position shown in FIG. 1 to the extended use position shown in FIGS. 2–5. Cable 56 can be extended to the movable handle 60 through a suitable guide and pulley mechanism (not shown). A latch assembly 55 is provided on each side to positively lock the storage housing 20 within the slides in a selected position.

The upper slide members 40, 42 are secured to the floor 24 of housing 20 while the lower slides 44, 46 are secured to the floor of the trunk. The H-shaped sliding track 52 allows the double length sliding movement of the storage housing 20 with respect to the trunk 13 and rear passenger area 12 of the vehicle and conventionally includes stop limits at the fully extended position in which the latch assembly 55 will align with a forward slot 45 in the lower tracks 42 and 44 in a position as shown in FIG. 6 for locking the storage housing 20 in the forward extended use position. Other slide mechanisms or other mechanisms which allow the movement of housing 20 between extended and retracted use positions can also be employed.

In operation, the storage housing 20, when in its retracted position as shown in FIGS. 1 and 3, provide an extended trunk opening 35 which communicates with the trunk area 22, thus, allowing additional storage space for the trunk even when the vertical seat back cushions 17–19 are in their normal back-supporting positions as shown in FIG. 1. For extending both the trunk storage area and allowing access to the extended area from within the rear seat passenger of the vehicle, the release handle 60 is moved to release levers 54 from apertures 45, allowing the storage housing 20 to move forwardly as shown in FIG. 2 whereupon the spring loaded latch leg 54 snap-locks under the force of coil springs 53 into indexing apertures 45 in the forward locked position, as illustrated in FIGS. 2 and 4–6. In this position, the trunk area 22 is greatly expanded with the forward motion of the storage area 35. The cubic volume of storage afforded by the housing 20 is further accessible through the pivoted storage lid 32 on the top surface of housing 20 as well as through door 19 forming the center back rest. Thus, the storage volume 35 defined storage housing 20 not only greatly expands the trunk storage area 22 but also allows the rear seat area to provide an enclosed concealed storage volume for bulky items otherwise not storable within the trunk. The cover 32 may include a locking latch 33 shown schematically in FIGS. 2 and 4 to prevent access to the storage compartment as may the pivotally mounted back rest 19. Thus, the storage housing 20 can remain a locked storage area within the vehicle even if the vehicle doors are unlocked. As a result of the construction of the present invention, a greatly improved expandable trunk storage area is provided which is readily accessible through the rear passenger area of a vehicle and one which conceals items stored therein as well as allows the secured storage of such items. The outer surfaces of the walls of housing 20 can be textured, upholstered, or otherwise finished to provide an aesthetically desirable appearance to the housing when in an extended position, thereby also providing an attractive storage area for the vehicle.

It will become apparent to those skilled in the art that various modifications to the preferred embodiment of the invention as described herein can be made without departing from the spirit or scope of the invention as defined by the appended claims.

The invention claimed is:

1. A movable storage system for the trunk storage area of a vehicle comprising:

a generally rectangular housing having an enclosed forward end and an open rearward end defined by a top, a bottom, a front and sidewalls; and a track for slidably mounting said generally rectangular housing to a vehicle such that said front wall faces forwardly in the vehicle and said open wall communicates with the truck of the vehicle and allows said housing to slide between a retracted position substantially within the trunk and an extended position substantially within the rear seat area of the vehicle.

2. A movable storage system for the trunk storage area of a vehicle comprising:

a generally rectangular housing having an enclosed forward end including rear seat backs for the vehicle and an open rearward end defined by a top, a bottom, a front and sidewalls; and means for movably mounting said generally rectangular housing to a vehicle such that said front wall faces forwardly in the vehicle and said open wall communicates with the trunk of the vehicle and allows said housing to move between a retracted position substantially within the trunk and an extended position substantially within the rear seat area of the vehicle.

3. The movable storage system as defined in claim 2 wherein said means for moving said housing comprises a slide mechanism extending between said floor of said housing and the trunk of a vehicle.

4. The movable storage system as defined in claim 3 and further including latching means for latching said housing in at least one of said retracted and extended positions.

5. The movable storage system as defined in claim 4 wherein said housing is molded.

6. The movable storage system as defined in claim 5 wherein said housing is molded of a rigid polymeric material.

7. A movable storage system for the trunk storage area of a vehicle comprising:

a generally rectangular housing having an enclosed forward end and an open rearward end defined by a top, a bottom, a front and sidewalls; and means for movably mounting said generally rectangular housing to a vehicle such that said front wall faces forwardly in the vehicle and said open wall communicates with the trunk of the vehicle and allows said housing to move between a retracted position substantially within the trunk and an extended position substantially within the rear seat area of the vehicle, wherein said top includes an opening lid for providing access to the interior of said housing when in an extended position.

8. A movable storage system for the trunk storage area of a vehicle comprising:

a generally rectangular housing having an enclosed forward end and an open rearward end defined by a top, a bottom, a front and sidewalls; and means for movably mounting said generally rectangular housing to a vehicle such that said front wall faces forwardly in the vehicle and said open wall communicates with the trunk of the vehicle and allows said housing to move between a retracted position substantially within the trunk and an extended position substantially within the rear seat area of the vehicle, wherein said front wall of said housing includes a door providing access to the interior of said housing when in its extended and retracted positions.

9. The movable storage system as defined in claim 8 wherein said door includes a seat back support.

10. The movable storage system as defined in claim 9 wherein said door is centered in said front wall.

11. A movable storage system for expanding the storage area of a vehicle comprising:

a storage housing having rigid sidewalls, an enclosed end and an open end;

means for movably mounting said housing to a vehicle such that said enclosed end faces the interior of the vehicle and said open end communicates with a storage area of the vehicle and said housing can be moved between a retracted position and an extended position substantially within the interior of the vehicle; and said housing including an access door located for accessing the interior of said housing from the interior of the vehicle wherein said housing includes a top and said access door of said housing is formed in said top.

12. A movable storage system for expanding the storage area of a vehicle comprising:

a storage housing having an enclosed end and an open end, wherein said housing is generally rectangular and is defined by a top, a floor, a front wall and sidewalls and said housing is shaped to extend into the trunk area of a vehicle;

means for movably mounting said housing to a vehicle such that said enclosed end faces the interior of the vehicle and said open end communicates with a storage area of the vehicle and said housing can be moved between a retracted position and an extended position substantially within the interior of the vehicle; and said housing including an access door located for accessing the interior of said housing from the interior of the vehicle.

13. The movable storage system as defined in claim 12 wherein said forward wall defines rear seat backs for the vehicle.

14. The movable storage system as defined in claim 12 wherein said means for movably mounting said housing comprises a slide mechanism extending between said floor of said housing and the trunk of a vehicle.

15. The movable storage system as defined in claim 14 wherein sa top includes an opening lid for providing access to the interior of said housing when in an extended position.

16. The movable storage system as defined in claim 15 wherein said front wall of said housing includes a door providing access to the interior of said housing when in its extended and retracted positions.

17. The movable storage system as defined in claim 16 and further including latching means for latching said housing in at least one of said retracted and extended positions.

18. A movable storage system for the trunk storage area of a vehicle comprising:

a generally rectangular housing having an enclosed forward end and an open rearward end defined by a top, a bottom, a front and sidewalls;

means for slidably mounting said generally rectangular housing to a vehicle such that said front wall faces forwardly in the vehicle and said open wall communicates with the trunk of the vehicle and allows said housing to move between a retracted position substantially within the trunk and an extended position substantially within the rear seat area of the vehicle; and an opening lid formed in said top for providing access to the interior of said housing when in an extended position.

19. The movable storage system as defined in claim 18 wherein said front wall of said housing includes a door providing access to the interior of said housing when in its extended and retracted positions.

20. The movable storage system as defined in claim 19 wherein said door includes a seat back support.

21. The movable storage system as defined in claim 18 wherein said forward wall defines rear seat backs for the vehicle.

22. The movable storage system as defined in claim 21 and further including latching means for latching said housing in at least one of said retracted and extended positions.

* * * * *